Figure 5:
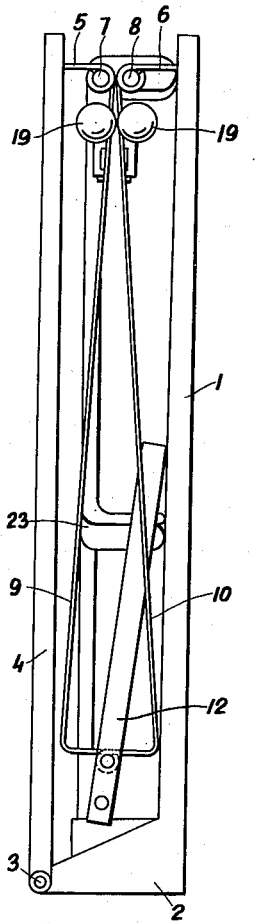

Feb. 21, 1961   W. FORMAN   2,972,284
BOOK FOR SPACIAL OBSERVATION OF STEREOSCOPIC IMAGES
Filed April 30, 1959   2 Sheets-Sheet 1
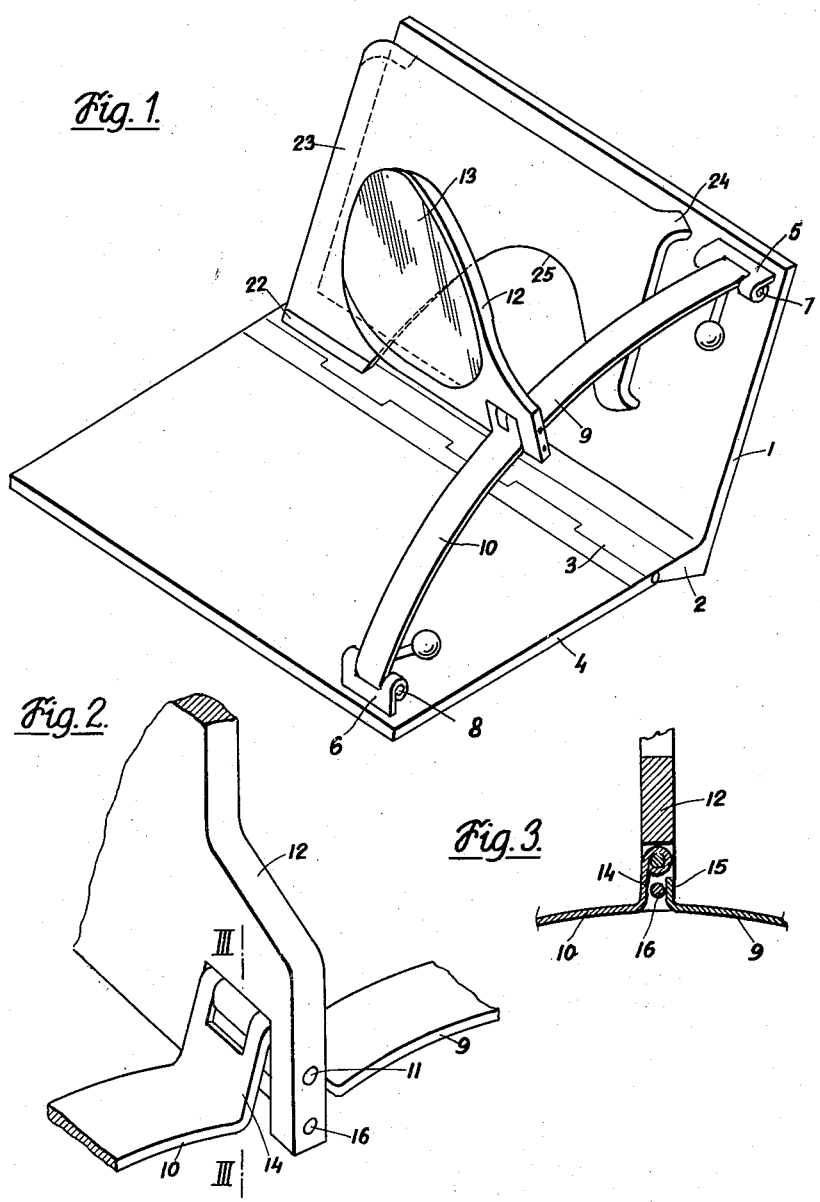
INVENTOR.
Werner Forman
BY Feb. 21, 1961    W. FORMAN    2,972,284
BOOK FOR SPACIAL OBSERVATION OF STEREOSCOPIC IMAGES
Filed April 30, 1959    2 Sheets-Sheet 2

INVENTOR.
Werner Forman
BY

United States Patent Office 2,972,284
Patented Feb. 21, 1961

2,972,284

BOOK FOR SPACIAL OBSERVATION OF STEREOSCOPIC IMAGES

Werner Forman, Prague, Czechoslovakia, assignor to Artia, podnik zahraničniho obchodu pro dovoz a vyvoz kulturnich statků, Prague, Czechoslovakia Filed Apr. 30, 1959, Ser. No. 809,975

Claims priority, application Czechoslovakia May 14, 1958

7 Claims. (Cl. 88—30)

The present invention relates to a book for spacial observation based on the principle of mirror stereoscopes.

A number of devices for observation of stereoscopic pictures are known, but none of them is adapted for the observation of large-size stereoscopic images arranged in the form of a book. While attempts have already been made to provide devices adapted for the observation of images in book-form, such devices have numerous drawbacks which render manufacture difficult and impose severe limitations on the use thereof.

The drawbacks of the known devices may be summed up as follows:

The known systems do not ensure the maintenance of a constant angle between the open pages of the book. Consequently, the mirror is not always at the same distance from each partial image. Due to its considerable mass and dimensions the mirror deviates from the predetermined position and is made to vibrate by every impact. The mounting of the mirror on the holder and of the holder on the upper edge of the apparatus require a large mirror or support. The suspension arranged at the upper edge of the mirror renders it impossible to provide a mirror of a physiologically and psychologically ideal shape. The holder of the large mirror and the observer's head, which is necessarily in an unfavourable position because of the suspension, cast shadows on the images, which impair the spacial illusion. The turning of pages below the mirror requires a certain skill and the page may easily be damaged when striking against the mirror.

The length of the arm carrying the mirror has to exceed the width of the page so that the arm protrudes from the closed apparatus and the dimensions of the book-covers have to be enlarged for safety reasons or, if the carrying arm is reinforced, it has to be telescoped in order not to protrude in the closed position of the apparatus beyond the outer edges of the pages. Both these modifications increase substantially the weight and cost of the article. The relatively considerable weight, lack of stability and the vibrations of the mirror hinder the inspection of the book when it is held in the hand. Due to its intricate manufacture and dependence on the direction and angle of the incoming light, the article is more or less an instrument to be used by a limited number of persons rather than a book for the widespread use by the general public.

In a book for spacial observation the spacial impression is only produced by two stereoscopic images which are placed at exactly equal distances from the respective eyes, in exactly identical positions and in an exact predetermined relationship while both images are illuminated in the same way.

These requirements are not fulfilled even in highly expensive products of the optical industry, which are intended for the observation of original photographs. The costs of such stereoscopes and the fact that an original photograph has to be used deter the widespread use of spacial images.

It is an object of the present invention to provide a book for spacial observation with stereoscopic pairs of images and a mirror arranged in a manner similar to that of a mirror-stereoscope, and which overcomes the above mentioned drawbacks of the existing devices of that character. The book according to the invention combines the accuracy and usefulness of an optical instrument on the one hand with the possibility of mass-production, adaptability for images of large dimensions and low cost on the other hand. The present invention uses stereoscopic images in a standard book-form.

According to the main feature of the invention the book for spacial observation comprises a resilient connecting bridge extending between the outer edges of the bookcovers and carrying a mirror, such connecting bridge having substantially the shape of a circular arc in its operative position and being collapsible into the interior of the book to a position substantially parallel to the closed book-covers.

Figure 6:
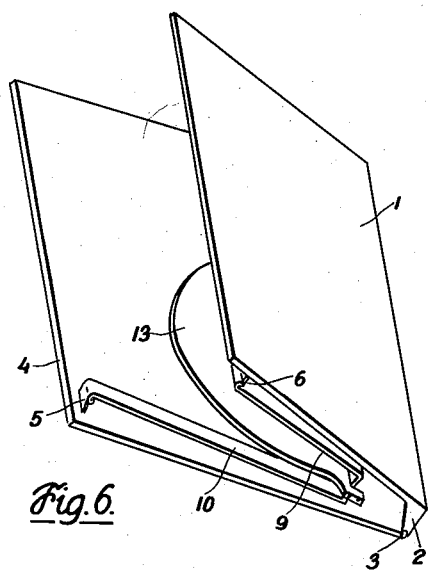
Figure 7:
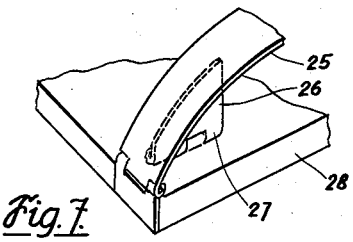
Figure 4:
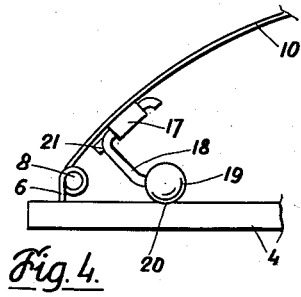
Figure 8:
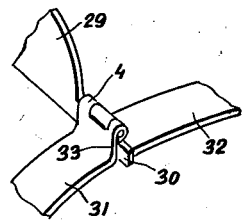

An example of a book according to the present invention is represented in the accompanying drawings, wherein Fig. 1 is a perspective view of the open book ready for use, Fig. 2 is an enlarged perspective view of a detail of the mirror-holder suspension, Fig. 3 shows the mirror-holder suspension in a cross-sectional view, Fig. 4 is an enlarged side view of the supporting member, Fig. 5 is a side view of the closed book, Fig. 6 is a perspective view of the book in almost closed position, Fig. 7 is a perspective view of another embodiment of the supporting member and Fig. 8 is a perspective view of a modified embodiment of the suspension means for the mirror-holder.

Referring to Figs. 1 to 5, it will be seen that the book for spacial observation comprises a cover-plate 1 rigidly connected to a stiff back or spine 2, forming an integral unit therewith. Hinged at the outer edge of the book-back 2 by means of a hinge 3 is the other coverplate 4 of the book. Secured near the edges of cover-plates 1 and 4 are hinges 5, 6, carrying a bridge consisting of two branches 9, 10 which are pivotally mounted on pins 7 and 8 respectively. The adjoining ends of the branches 9 and 10 of the bridge are pivotally connected by a pin 11, which is anchored in a holder 12 carrying a mirror 13. The adjoining end portions of branches 9, 10 of the bridge are provided with outwardly bent clamping lugs 14, 15 respectively which, in the operative position of the bridge, clamp a fixing pin 16 which also is anchored in the mirror holder 12, as shown in Figs. 2 and 3. The mirror 13 is automatically placed into its correct operative position, when the bridge is unfolded.

The bridge is secured in its operative position by fixing means, an example of which is shown in greater detail in Fig. 4. Fastened to the bridge is a hinge 17 pivotally carrying an arm 18 on which a ball 19 or other suitable member is mounted. A recess 20 adapted to receive the ball 19 is provided at a suitable point in the cover-plate 4. The rocking movement of the arm 18 towards the interior of the book is limited by a stop 21, whereas, in the direction towards the outer edge of the book, the arm 18 with the ball 19 is freely movable. In its operative position shown in Fig. 4, the ball 19 is accommodated in the recess 20 and the supporting-member 17—19 supports the branch 10 or 9 of the bridge in a position, in which both branches of the bridge are correctly tensioned to form an arc as shown in Fig. 1. If the book is to be closed, the balls 19 are pushed towards the outer edge of the book, whereupon the bridge is stretched and flattened by its own resiliency; the book may then be closed as shown in Fig. 5, where both branches of the bridge are folded and the mirror lies flat in the space between the cover-plates 1 and 4.

A spacing plate 23 with lugs 24 is mounted in the book-back 2, e.g. in a holder 22, in order that stacks of pictures of different thickness may be viewed. A recess 25 is provided in the spacing plate 23 for accommodating the mirror 13 with its holder 12, when the book is closed.

The book provided with the supporting member 17—19 described above forms in its open position a stiff and rigid unit, because the bridge 9, 10 is properly tensioned and, moreover, due to the fact that the balls 19 bear against the recesses 20 in the book-covers under the stress of the bridge, any play in this mounting is eliminated. The rigid connection of the book-back 2 with the cover-plate 1, is highly advantageous, as it greatly increases the stiffness of the whole system; the cover-plates 1, 4, the book-back 2 and the bridge 9, 10 form an integral, rigid structure free from any play, with the result that a perfect relationship between the individual images and the mirror is secured, which is an indispensable prerequisite for a correct operation of the apparatus.

Fig. 7 shows a modification of the supporting member. The bridge 25 is supported by means of a wing 26 pivotally mounted by a hinge 27 which is secured to the book cover 28. In its collapsed position the wing 26 lies flat on the cover-plate 28.

Fig. 8 shows a modified mounting of the mirror-holder 29 having a projection 30 which, in the operative position of the bridge 31, 32, is clamped from either side by the lugs 33 of the bridge. The mirror-holder 29 is thus automatically fixed in its correct operative position.

The book for spacial observation according to the invention is highly advantageous because the mere opening of the book automatically places the mirror in its correct operative position and the bridge forms a smooth guide for the pages of the book when they are turned. The bridge guides the pages so as to eliminate the danger of their striking the mirror or its holder and protects the images from damage. The arrangement according to the invention ensures a small weight, a high degree of rigidity, and accuracy and prevents vibrations of the mirror.

I claim:

1. A book for spacial observation of stereoscopic images comprising a first cover plate, a book back rigidly connected to said first cover plate and extending along the inner edge of the latter, a second cover plate hingedly connected, at its inner edge, to said book back for swinging movement relative to said first cover plate between open and closed positions, said first and second cover plates being adapted to receive the stereoscopic images to be observed, a hinge on each of said cover plates adjacent the outer edge of the latter, a resilient bridge including first and second branches and central hinge means pivotally connecting adjoining ends of said first and second branches, while the opposite ends of said first and second branches are pivotally mounted on said hinges adjacent the outer edges of said first and second cover plates, respectively, so that said branches are extended in end to end relationship between said cover plates in the open position of the latter and are folded upon each other with said adjoining end extending toward said book back between said cover plates in said closed position of the latter, supporting means interposed between the portions of said branches adjacent said opposite ends and the related cover plates and operative, in said open position of the cover plates, to urge said opposite end portions of the branches angularly away from said related cover plates and thereby impart a tensioned arcuate shape to said bridge which is concave in the direction toward said book back, a mirror, a mirror holder carrying said mirror and being pivotally mounted on said central hinge means of the bridge, and cooperating means on said mirror holder and bridge operative to secure said holder in a predetermined erected position relative to said bridge when the latter is in said tensioned arcuate shape.

2. A book for spacial observation of stereoscopic images as in claim 1; wherein said mirror holder extends from said bridge in the direction away from said book back when said mirror holder is in said erected position, and said bridge has a smooth surface facing toward said book back when said bridge has said tensioned arcuate shape so that said smooth surface is adapted to guide pages turned between said cover plates.

3. A book for spacial observation of stereoscopic images as in claim 1; wherein said supporting means includes an arm pivotally mounted on said opposite end portion of each branch to swing relative to the latter about an axis at right angles to the pivoting axis of the branch with respect to the related cover plate, and a ball on said arm adapted to bear against said related cover plate when said arm is in an operative position projecting from said branch toward said related cover plate, each of said cover plates having a recess therein located to receive said ball of the related supporting means and thereby releasably hold said pivoted arm in said operative position thereof.

4. A book for spacial observation of stereoscopic images as in claim 1; wherein said supporting means includes a wing pivotally mounted on each cover plate to swing relative to the latter between a flattened position and operative position projecting at right angles from the cover plate, said wing being dimensioned to bear against the related branch of the bridge in said operative position of the wing.

5. A book for spacial observation of stereoscopic images as in claim 1; wherein said cooperating means for securing the mirror holder in said predetermined erected position includes clamping lugs on said branches of the bridge and abutment means on said mirror holder offset relative to the axis of said central hinge means and being embraced closely by said clamping lugs when said bridge is in said tensioned arcuate shape thereby to prevent swinging of said mirror holder relative to said bridge.

6. A book for spacial observation of stereoscopic images as in claim 5; wherein said clamping lugs on said branches of the resilient bridge are defined by portions of said branches adjacent said adjoining ends which are bent relative to the remainder of said branches so as to extend parallel to each other with said abutment means therebetween when said bridge is in said tensioned arcuate shape.

7. A book for spacial observation of stereoscopic images as in claim 1; wherein said mirror holder extends from said central hinge means of the bridge in the direction away from said book back when said mirror holder is in said erected position, and said bridge has a smooth guiding surface facing toward said book back when said bridge has said tensioned arcuate shape so that said smooth guiding surface is adapted to guide pages turned between the cover plates in said open position of the latter; and further comprising a spacing plate mounted on said book back parallel to said first cover plate, said spacing plate having a recess accommodating said mirror holder and the mirror carried thereby when said cover plates are in said closed position thereof.

References Cited in the file of this patent

UNITED STATES PATENTS 871,974    Verbeck _____ Nov. 26, 1907